Feb. 13, 1934.   W. D. BURTON   1,946,776
MECHANICAL STOKER
Filed Aug. 15, 1931
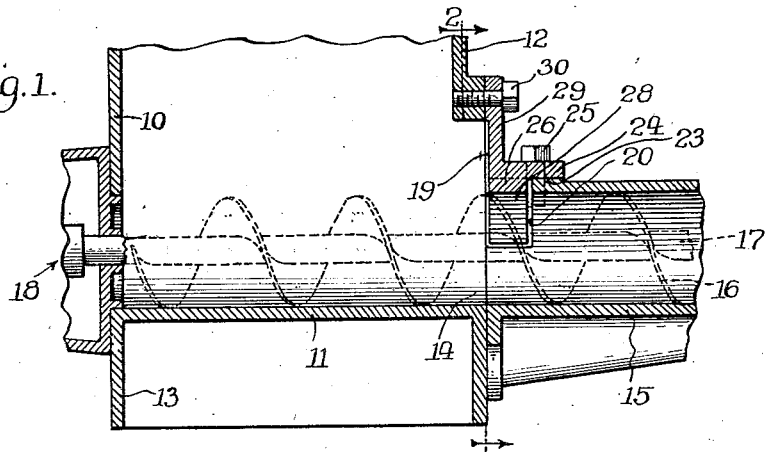
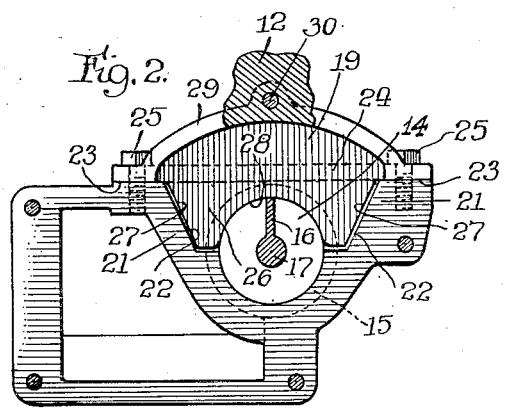
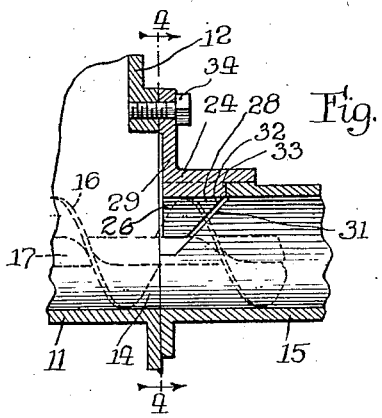
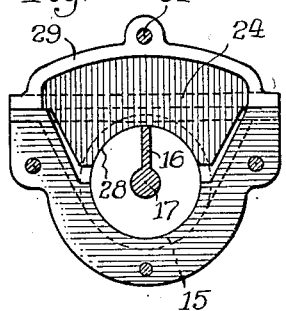
Inventor:
Warren Dean Burton,
By Grindahl, Parker & Carlson
Attys Patented Feb. 13, 1934

1,946,776

UNITED STATES PATENT OFFICE

1,946,776

MECHANICAL STOKER

Warren Dean Burton, Goshen, Ind., assignor to Combustioneer, Inc., Goshen, Ind., a corporation of Illinois Application August 15, 1931. Serial No. 557,301

8 Claims. (Cl. 198—64)

The present invention relates to improvements in mechanical stokers and is particularly applicable to stokers of the underfeed type.

In one form of underfeed stokers, coal is fed by a power driven screw conveyor from a hopper through a conveyor casing or duct into the bottom of a retort where it is consumed. The coal supplied to the hopper often contains foreign objects, such as pieces of iron, steel or rock which will not crush. Frequently, these objects form obstructions at the outlet of the hopper, thereby clogging the apparatus. In this event, if the drive for the screw conveyer is not disconnected, serious damage to the apparatus may result. To avoid the possibility of such damage, it is common to interpose means in the drive for the screw conveyor which will shear or otherwise disconnect the drive when subjected to a force somewhat in excess of the force required in normal operation, and which can be readily replaced.

If an obstruction in the hopper causes a breakdown in the operation, obviously the obstruction must be removed before again starting up the operation. Heretofore, it has generally been necessary to empty the hopper to remove the obstruction, thereby involving considerable labor and inconvenience, and often keeping the stoker out of operation for a considerable period of time.

The primary object of the present invention, therefore, resides in the provision in an underfeed stoker of novel means for permitting obstructions in the hopper to be readily and quickly removed.

A more specific object resides in the provision of a new and improved removable closure for a continuous aperture formed in the adjacent or meeting portion of the conveyor duct and the hopper, and rigidly supported during operation by means which permits the closure to be readily and quickly removed, said closure being fashioned to constitute or define a part of the duct when assembled.

Other objects and advantages will become apparent in the following description and from the accompanying drawing, in which:

Figure 1 is a vertical, longitudinal sectional view through the hopper mechanism of a stoker embodying the features of the invention.

Fig. 2 is a transverse section through the device taken along the line 2—2 of Fig. 1.

Fig. 3 is a fragmentary sectional view of a modified form of the invention.

Fig. 4 is a transverse sectional view through said modified form as indicated by the line 4—4 of Fig. 3.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more specifically to the drawing, the numerals 10, 11 and 12 designate, respectively, the rear, bottom and front walls of a fuel supply hopper which is normally supported by a base 13. One side wall of the hopper, in this instance the wall 12 is provided with an aperture 14 with which a discharge duct 15 communicates. The duct 15 is preferably cylindrical in shape and provides a housing through which fuel is fed from the hopper to the retort (not shown) of the stoker. Generally, a conveyer in the form of a feed screw 16 carried by a shaft 17 is employed to convey the fuel from the hopper, the screw being arranged to extend through the duct 15 a substantial distance into the hopper. The shaft 17 is driven in any conventional manner, as by the prime mover designated generally at 18. Usually the driving connections include such means as a shear pin or overload release device arranged to discontinue to drive the shaft 17 should an obstruction, such as a piece of iron, steel or stone, in the hopper base bind or otherwise interfere with the free rotation of the conveyer screw.

The present invention resides primarily in the provision of novel means for facilitating the removal of obstructions in the base of the hopper tending to interfere with the operation of the conveyer screw without necessitating the removal of all of the coal from the hopper. To this end, the aperture 14 as may be seen in Fig. 2 is substantially larger than the diameter of the duct 15 and the duct is arranged to communicate with the lower side of this aperture 14 so that a large space 19, opening into the interior of the hopper, is provided immediately above the end of the duct 15. The end of the duct 15 adjacent this portion 19 of the aperture is cut away as at 20, said cut away portion constituting, in this instance, substantially the upper half of the duct 15 adjacent to the aperture 14. The upper portion 19 of the aperture 14, together with the aperture provided by cutting away the end of the duct, provides a large opening into the interior of the hopper at the point where foreign material is most apt to bind the feed screw.

In normal operation, this opening is sealed by a removable closure, one form of which is illustrated in Figs. 1 and 2. Thus, the end of the conveyer duct 15 carries a pair of brackets 21 which extend laterally and outwardly from either side of the conveyer duct. These brackets may, if desired, be formed integrally with the end of the conveyer duct. The brackets on either side of the cut-away portion 20 of the duct are of greater width than the width of said cut-away part. Each bracket is recessed, as at 22 (Fig. 2), to form pockets for receiving and supporting parts of the closure member, the side wall of each pocket remote from the hopper being substantially flush with the margin of the recessed part 20 of the duct. The top of each bracket is flat, as at 23.

Thus, the brackets 21 in effect constitute a unitary hollow bracket having side walls and an outer end wall about the margins of the opening in the duct 15, and defining a space located externally of the normal confines of the duct in communication with the opening in the duct and with the space 19. The space in the hollow bracket is adapted to open to the exterior when uncovered.

The closure member, in this form, embodies a flat plate 24 arranged to extend transversely of the device between the flat portions 23 on the brackets and to be secured thereto in any suitable manner as by screws 25. The flat plate has integrally formed therewith a downwardly extending boss 26 of substantially the same width as the width of the cut-away part 20 of the duct. The outer sides 27 of the boss 26 are formed complementary to the contour of the recesses 22 so as to fit snugly therein and the boss is centrally provided with an arcuate recess 28. The radius of curvature of the recess 28 is approximately the same as that of the duct 15 so that, when the parts are assembled, with the sides of the boss disposed snugly within the recesses 22 in the brackets 21, the face of the arcuate recess 28 is flush with and constitutes a continuation of the inner surface of the duct 15. The plate 24 has an integrally formed, upwardly extending flange 29 which is of a size to completely overlie and close the space 19 in the side wall 12. A screw 30 or the like through this flange into the wall 12 of the hopper additionally supports the closure in place.

In the modified form of structure shown in Figs. 3 and 4, the general arrangement of parts is substantially the same and those parts which are similar bear the same reference numerals. In this embodiment, however, the recesses 22 in the brackets 21 have the side walls thereof, which are directly opposed to the hopper, formed at an angle as shown at 31 so that the side walls slope gently from the top of the duct to points near the side wall of the hopper. The outer sides of the bosses 26 are correspondingly shaped, as at 32, to fit within the recesses. The upper and central part of the boss 26 has a shoulder 33 arranged to abut against the end of the duct 15. This engagement, together with the annular relationship of the parts, forms what may be termed an interlock between the closure member and the brackets such that only a single screw 34 or a securing means through the flange 29 into the wall of the hopper is necessary.

From the foregoing, it will be apparent that a new and improved means has been provided by which access to the interior of the hopper, adjacent the feed screw, may be had. The aperture is of such size that any foreign body may be readily removed therefrom. The arrangement of parts provides ample rigidity and security of the parts in use without, however, preventing the closure member from being rapidly and easily removed and reassembled.

I claim as my invention:

1. In a stoker, in combination, a fuel hopper having an upright wall at one end, said wall having an outlet aperture, a horizontal discharge duct having a passage with its inlet end in communication through said aperture with said hopper, a rotary conveyor extending from said hopper through said aperture into said passage, one portion of said aperture being enlarged to define a space along said conveyor accessible from the exterior of said duct, a hollow bracket on the inlet end of said duct at a point adjacent said space, the interior of said bracket defining a space externally of the normal confines of said duct, said last mentioned space opening outwardly, opening inwardly into said inlet end of said passage and opening to said first mentioned space to define an opening therewith, closure means removably secured in position on said bracket for closing said spaces against access from the exterior of said hopper and duct, and a projection on the interior of said closure means substantially filling said last mentioned space.

2. In a stoker, in combination, an upright fuel hopper having a horizontal trough at the bottom and an upright wall at one end of said trough, said wall having an outlet aperture, a horizontal discharge duct having a cylindrical passage with its inlet end in communication and longitudinal alignment with said trough, a rotary conveyor with a screw vane extending along said trough through said aperture into said passage, the bottom of said trough and the lower portion of said aperture conforming closely to the curvature of said vane, the upper portion of said aperture being enlarged to define a space along said conveyor accessible from the exterior of said duct, a hollow bracket formed on the top of the inlet end of said duct, said bracket having side walls and an outer end wall, the interior of said bracket defining a space open at the top and opening downwardly into said inlet end of said passage and opening to said aperture, the top of said last mentioned space constituting a continuation of said first mentioned space to define an opening therewith, a closure removably secured in position on said bracket for closing said spaces against access from the exterior of said hopper and duct, and a depending projection on the interior of said closure, said projection having an inner arcuate surface forming part of the inner surface of said passage, said arcuate surface presenting an inner edge in close shearing relation to said vane.

3. In an underfeed stoker, in combination, an upright fuel hopper having a horizontal trough at the bottom and an upright wall at one end of said trough, said wall having an outlet aperture, a horizontal discharge duct having a cylindrical passage with its inlet end in communication and longitudinal alignment with said trough, a rotary conveyor with a screw vane extending along said trough through said aperture into said passage, the bottom of said trough and the lower portion of said aperture conforming closely to the curvature of revolution of said vane, the upper portion of said aperture being enlarged laterally and vertically beyond said duct to define a space along said conveyor accessible from the exterior of said duct, a hollow bracket formed on the top of the inlet end of said duct, said bracket having upwardly and outwardly inclined side walls and an outer end wall, the interior of said bracket defining a space open at the top and opening downwardly into and about said inlet end of said passage and opening to said aperture, the top of said last mentioned space constituting a continuation of said first mentioned space to define an opening therewith, the top of said bracket being flat, a closure removably secured in position on said bracket, said closure having a flat horizontal plate and an upright flange respectively closing said last and first mentioned spaces against access from the exterior of said hopper and duct, and a depending projection on the interior of said closure, said projection substantially filling said last mentioned space and having two laterally opposed lugs with an inner arcuate surface conforming to said passage and forming part of the inner surface thereof, said surface presenting an inner edge in close shearing relation to said vane.

4. In a stoker, in combination, a fuel hopper having an upright wall with an outlet aperture, a fuel duct in communication through said aperture with said hopper, a conveyor extending from said hopper through said aperture into said duct, a portion of the inlet edge of said duct being recessed to form an opening in the wall of said duct and in communication with said aperture, said opening affording access to said conveyor at the junction of said hopper and said duct, a bracket formed on said duct, said bracket defining a marginal wall about said opening outside of said hopper, said wall defining a space externally of the normal confines of said duct in communication with said opening, and a closure removably secured in position on said bracket to close said space.

5. In a stoker, in combination, a fuel hopper having an upright wall with an outlet aperture, a fuel duct in communication through said aperture with said hopper, a conveyor extending from said hopper through said aperture into said duct, a portion of the inlet edge of said duct being recessed to form an opening in the wall of said duct and in communication with said aperture, said opening affording access to said conveyor at the junction of said hopper and said duct, a bracket formed on said duct, said bracket defining a marginal wall about said opening outside of said hopper, said wall defining a space externally of the normal confines of said duct and in communication with said opening, and a closure removably secured in position to close said space, said closure having an internal projection extending into said opening to form a section of the wall of said duct.

6. In a stoker, in combination, a fuel hopper having an upright wall with an outlet aperture, a fuel duct in communication through said aperture with said hopper, a conveyor extending from said hopper through said aperture into said duct, a portion of the inlet edge of said duct being recessed to form an opening in the wall of said duct and in communication with said aperture, said opening affording access to said conveyor at the junction of said hopper and said duct, a bracket formed on said duct, said bracket defining a marginal wall about said opening outside of said hopper, said wall defining a space externally of the normal confines of said duct and in communication with said opening and having an outer marginal edge in a single plane defining an opening adapted to establish communication of said space with the exterior of said bracket, and a closure having a flat cover portion removably secured in position across said edge to close said last mentioned opening.

7. In a stoker, in combination, a fuel hopper having a generally vertical wall with an outlet aperture, a fuel duct in communication through said aperture with said hopper, a screw conveyor extending from said hopper through said aperture into said duct, the upper portion of the edge of said aperture being spaced from the upper portion of said conveyor, the upper portion of the edge of the inlet end of said duct being spaced outwardly from said aperture to define an opening giving access to the upper portion of said conveyor outside of said hopper, a bracket formed on the upper portion of the inlet end of said duct next to said hopper and defining an upstanding marginal wall about said opening, said wall forming an enlarged space adapted to be open to the exterior and in communication with said opening in said duct and with the upper portion of said aperture, and a closure removably secured in position on said bracket to close said space from the exterior.

8. In a stoker, in combination, a fuel hopper having a generally vertical wall with an outlet aperture, a fuel duct in communication through said aperture with said hopper, a screw conveyor extending from said hopper through said aperture into said duct, one portion of the edge of said aperture being out of shearing relation with the adjacent portion of said conveyor to define an open space therebetween, the portion of the edge of the inlet end of said duct adjacent said space being spaced outwardly from said aperture to define an opening giving access to said conveyor outside of said hopper, an elongated hollow bracket on the inlet end of said duct next to said hopper and defining an outstanding marginal wall about said opening, said wall forming an enlarged space adapted to be open to the exterior and in communication with said first mentioned space and said opening in said duct, and a closure removably secured in position on said bracket to close said last mentioned space from the exterior.

WARREN DEAN BURTON.